United States Patent
Krichever

(10) Patent No.: US 6,981,642 B2
(45) Date of Patent: Jan. 3, 2006

(54) NON-PARALLAX OPTICAL AUTO-FOCUSING SYSTEM AND METHOD

(75) Inventor: Mark Krichever, Hauppauge, NY (US)

(73) Assignee: Symbol Technologies, Inc., Holtsville, NY (US)

(*) Notice: Subject to any disclaimer, the term of this patent is extended or adjusted under 35 U.S.C. 154(b) by 187 days.

(21) Appl. No.: 10/621,283

(22) Filed: Jul. 17, 2003

(65) Prior Publication Data

US 2005/0011952 A1    Jan. 20, 2005

(51) Int. Cl.
G06K 7/10    (2006.01)

(52) U.S. Cl. ............. 235/454; 235/462.23; 235/462.35

(58) Field of Classification Search ................ 235/454, 235/462.35, 473.03, 462.23
See application file for complete search history.

(56) References Cited

U.S. PATENT DOCUMENTS

| | | | |
|---|---|---|---|
| 5,461,220 A * | 10/1995 | Ogino | ........................ 235/454 |
| 5,604,344 A | 2/1997 | Finarov | |
| 5,610,884 A * | 3/1997 | Yanagidate | .............. 369/44.28 |
| 6,276,606 B1 | 8/2001 | Liou et al. | |
| 6,677,565 B1 * | 1/2004 | Wahl et al. | ............... 250/201.3 |
| 6,713,718 B1 * | 3/2004 | Lu | ......................... 219/121.69 |

OTHER PUBLICATIONS

International Search Report.

* cited by examiner

Primary Examiner—Diane I. Lee
Assistant Examiner—Seung H Lee
(74) Attorney, Agent, or Firm—Carter, DeLuca, Farrell & Schmidt, LLP

(57) ABSTRACT

A non-parallax optical auto-focusing system focuses an image and determines a distance to an optical target without being prone to errors due to parallax. The system includes a first beam splitter, a second beam splitter, and a lens positioned therebetween on an optical axis. An aiming beam is directed towards an optical target and the redirected reflected beam is received by a quadrant sensor assembly for generating an output signal indicative of a parameter of the redirected reflected aiming beam. A processor receives the output signal and generates a control signal for actuating an actuator to reposition the lens. The system continues to position the lens until the measured parameter is within a predetermined range for optimally focusing the optical target on an image sensor. The distance to the optical target is determined by using a look-up table to correlate the measured parameter to the distance to the optical target.

22 Claims, 3 Drawing Sheets

NON-PARALLAX OPTICAL AUTO-FOCUSING SYSTEM AND METHOD

BACKGROUND OF THE INVENTION

1. Field of the Invention

This invention relates to imaging in optical code reading devices. More particularly, the present invention relates to a non-parallax optical auto-focusing system and method. In particular, the present invention relates to a non-parallax optical auto-focusing system and method for use in mobile and stationary optical code readers.

2. Description of the Related Art

Auto-focusing systems in conventional cameras, optical code readers, etc. generally employ devices to determine the distance between the auto-focus device and the selected target or object before moving one or more lenses for focusing the object. Typically, such devices utilize the triangulation technique for measuring distances.

An image sensor based on the triangulation technique comprises an illumination device, such as an LED or a laser, and a detector, such as CCD. The illumination device projects a light-dot on the object. A proportion of the light reflected from the object's surface passes through a lens situated in front of the camera, optical code reader, etc. and onto a number of sensing elements in the camera. The angle at which the reflected light projects onto the sensing elements is established and the distance between the sensor and the object is determined through a number of calculations. One or more lenses are then automatically moved in accordance with the measured distance for auto-focusing the camera, optical code reader, etc.

This triangulation technique is typically prone to errors due to parallax, especially for nearby objects, as is generally the case for optical code readers used to image optical codes. Parallax is a change in the object's apparent position due to a change in the position of the sensor.

Another distance measuring technique utilizes the principle of image frequency content analysis. A distance measuring system employing image frequency content analysis impinges a beam on an optical target and captures the reflected beam for processing by an image sensor having an array. The principle of image frequency content requires the system to measure the value of each pixel within the predetermined array and compare that value to the value of adjacent pixel to determine the difference in pixel values.

The process repeats for all the pixels within the array where the sum of all the differences in pixel values is determined as an absolute value, thereby indicating a level of contrast in the array. Generally, the higher the measured contrast is, the sharper (i.e. more focused) the image of the optical target. However, a system employing this principle necessitates additional processing steps to calculate the differences in pixel values and determine the level of contrast in the image of the optical target. In such a system, the necessity of additional processing steps limits the response time of the system.

Accordingly, a need exists for an optical auto-focusing system and method that are not prone to parallax errors, provide instantaneous or real-time auto-focusing of an image, and configurable and adaptable for incorporation in various devices, such as cameras and mobile and stationary optical code readers.

SUMMARY OF THE INVENTION

It is an aspect of the present invention to provide a non-parallax optical auto-focusing system and method that are not prone to parallax errors (non-parallax) and provide instantaneous or real-time auto-focusing of an image.

Another aspect of the present invention is to provide a non-parallax optical auto-focusing system and method configurable and adaptable for incorporation in various devices, such as cameras and mobile and stationary optical code readers.

Another aspect of the present invention is to provide an optical auto-focusing system and method capable of determining a focus quality of an image impinged onto an image sensor and adjusting, if necessary, at least one lens for changing the focus quality of the image.

A non-parallax optical auto-focusing system and method are herein disclosed which achieve these and other aspects of the present invention. The non-parallax optical auto-focusing system and method of the present invention are not prone to parallax errors, provide instantaneous or real-time auto-focusing of an image, and are configurable and adaptable for incorporation in various devices, such as cameras and mobile and stationary optical code readers.

In one embodiment of the present invention, a non-parallax optical auto-focusing system includes an image generating assembly having an image sensor, first and second beam splitters, a lens, and a quadrant sensor assembly. Additionally, the non-parallax optical auto-focusing system includes a signal processor, a controller, and an actuator. Preferably, the non-parallax optical auto-focusing system of the present invention is configured and dimensioned to fit within a conventional form factor of an optical code reader, such as the SE900 and SE1200 form factors developed by Symbol Technologies, Inc. The optical code reader further includes an actuation mechanism, such as a trigger assembly, button, or switch, for activating the non-parallax auto-focusing system.

According to the present invention, the image generating assembly includes an aiming beam generator, preferably a laser beam generator. The output of the aiming beam generator is an aiming beam directed to the first beam splitter via an output lens that adjusts a focus quality of the aiming beam. The output lens also directs the aiming beam through an aperture, prior to reaching the first beam splitter, which modifies, or shapes the aiming beam to include a predetermined geometrical shape or design (e.g., a cross, an "x", a square, a dot, or other desired shape or design). The aiming beam may be pulsed, that is, the aiming beam generator switches on and off at a predetermined rate to generate a pulsed aiming beam.

The first beam splitter redirects the aiming beam towards the optical target as an output beam. The output beam impinges upon the optical target where the output beam is reflected back towards the optical code reader as a reflected beam. The reflected beam then impinges upon the first beam splitter. The entire reflected beam substantially transmits through the first beam splitter and propagates towards the lens coupled to the actuator. The lens adjusts an image property, such as focus quality, of the reflected beam. The actuator is capable of being actuated for moving the lens along an optical axis of the optical code reader for modifying the image property of the reflected beam. A feedback system of the auto-focusing system controls the actuation of the actuator. The feedback system includes the second beam splitter, the quadrant sensor assembly, the signal processor, and the controller as further described below.

The reflected beam impinges upon the second beam splitter where a portion of the reflected beam is transmitted therethrough as an image beam for impingement upon the image sensor positioned along the optical axis. The second beam splitter redirects one other portion of the reflected beam, referred to as a redirected reflected beam, towards the quadrant sensor assembly. The quadrant sensor assembly preferably includes a receiving lens, an optical filter, an optical mask, and a quadrant sensor.

The receiving lens focuses the redirected reflected beam such that substantially the entire redirected reflected beam propagates towards the optical filter, the optical mask, and the quadrant sensor. Cooperatively, the receiving lens and the optical filter combine to reduce or minimize reflections and/or refractions of the redirected reflected beam. The optical mask refines the characteristics of the redirected reflected beam that impinge upon the quadrant sensor by blocking unwanted images and projections from reaching the quadrant sensor.

Preferably, the optical mask includes a geometric shape or design identical to the geometric shape or design projected by the aiming beam and the redirected reflected beam. With such a design, the optical mask only allows the geometric shape or design of the redirected reflected beam to traverse there through. Therefore, the optical mask minimizes unwanted images and maximizes the transmission of the geometric shape or design to the quadrant sensor.

The quadrant sensor includes a processor and/or associated software and/or circuitry for determining, in one embodiment disclosed herein, the power level or light intensity of the geometric shape or design projected by the redirected reflected beam. The quadrant sensor compares this determined value to at least one stored value, such as a desired, or optimum power level. An output signal generated by the quadrant sensor is preferably indicative of the difference between the measured light intensity of the geometric shape or design projected by the redirected reflected beam and the at least one stored value.

The signal processor, which may be integral with the controller and the quadrant sensor assembly, generates a control signal using information relayed by the output signal. The controller, upon receiving the control signal, generates an actuation signal for a predetermined amount of time for actuating the actuator for a period of time equal to the predetermined period of time for moving the lens. As the lens is moved, the feedback system continues to monitor the measured light intensity of the redirected reflected signal and continues to actuate the actuator. Once the measured light intensity indicates that the lens is properly positioned between the two beam splitters, i.e., the measured light intensity is within a desired power level range, the controller stops actuating the actuator. The system of the present invention can also determine the distance to the optical target by using a look-up table to correlate the measured parameter to the distance to the optical target.

The actuator is capable of moving the lens along the optical axis in both the proximal and distal directions instantaneously. The lens focuses an image projected by the reflected signal upon the image sensor and determines distance to the optical target without being prone to errors due to parallax. The system and method of the present invention are hence described as being non-parallax.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
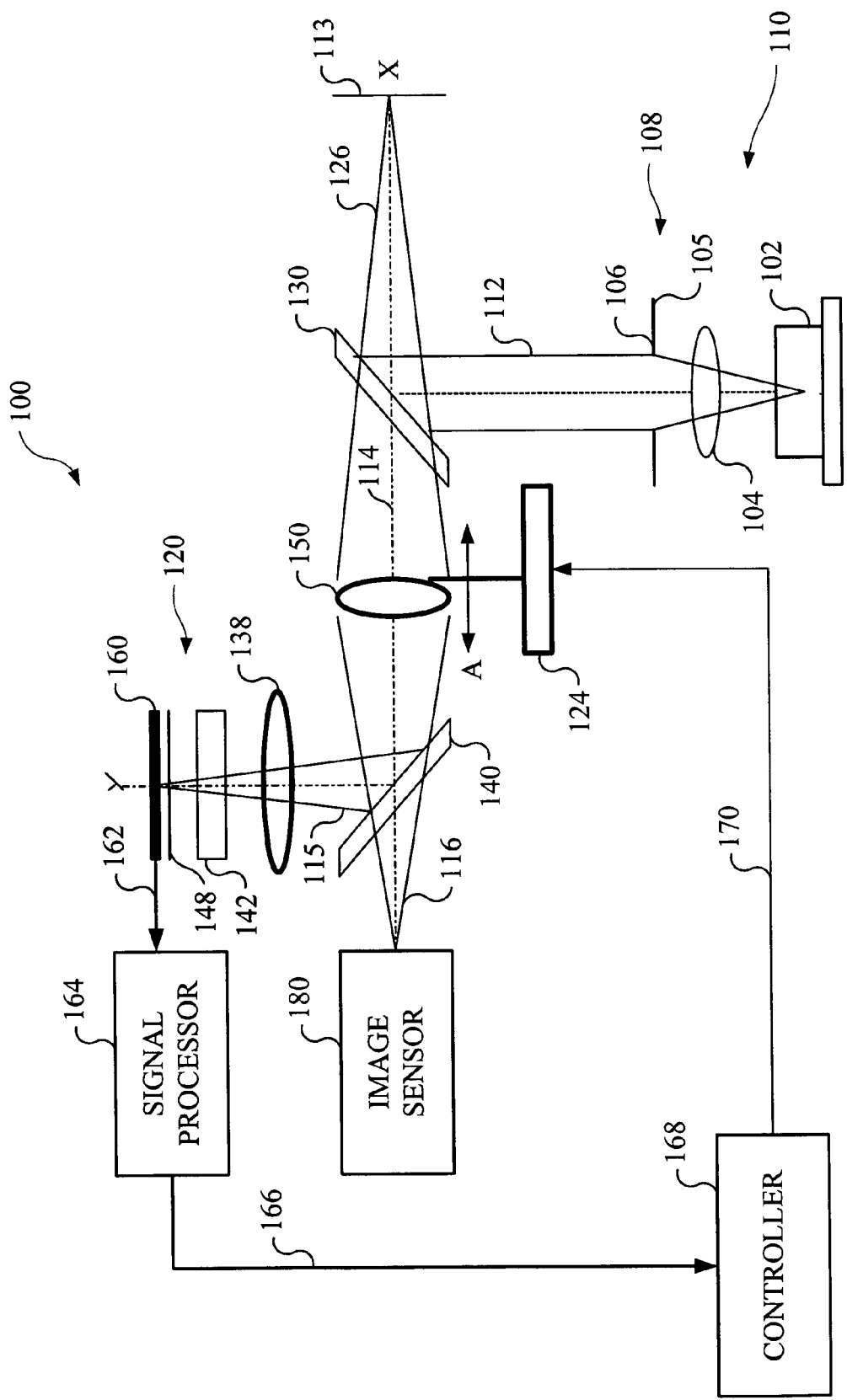
FIG. 1 is block diagram of a non-parallax optical auto-focusing system in accordance with the present invention.
Figure 4:
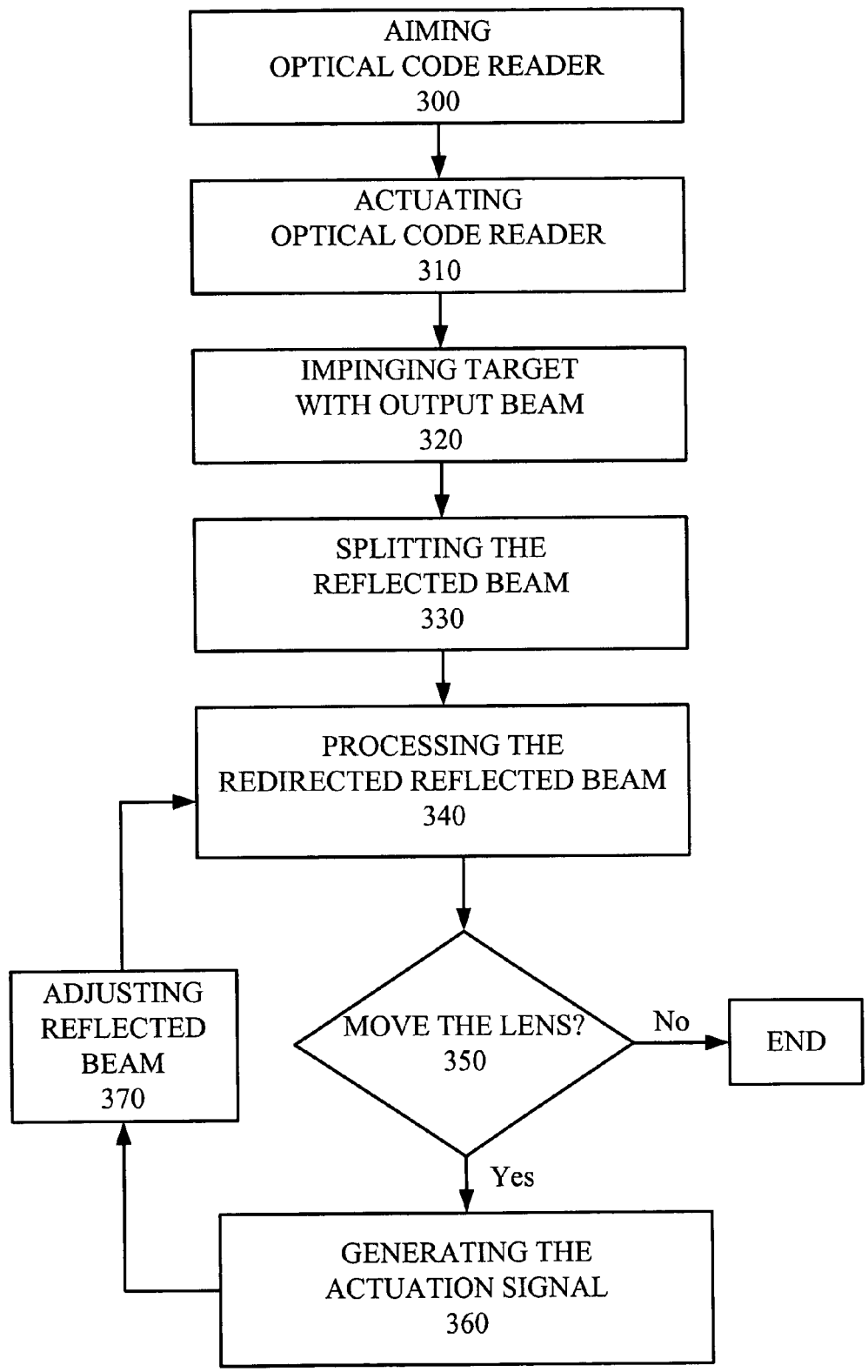
FIG. 4 is a flow chart of a non-parallax optical auto-focusing method using the system shown in FIG. 1 and according to the present invention.

With reference to FIG. 1, there is illustrated a non-parallax optical auto-focusing system designated generally by reference numeral 100 in accordance with the present invention. FIG. 4 illustrates a flow chart of a method of operation using the system shown in FIG. 1. The non-parallax optical auto-focusing system 100 and method are adaptable and configurable for incorporation in various devices, such as cameras, mobile phones, PDAs, terminals, etc., for providing instantaneous or real-time auto-focusing of an image and without being prone to errors due to parallax.

The system 100 and method are especially suited and described herein for incorporation in optical code readers used for imaging and reading optical codes, such as bar-codes. Preferably, the non-parallax optical auto-focusing system 100 is configured and dimensioned to fit within a conventional form factor of an optical code reader 200 (see FIGS. 2 and 3), such as the SE900 and SE1200 form factors developed by Symbol Technologies, Inc., of an optical code reading system 500. The optical code reading system 500 further includes a display 502, a housing 504 encasing at least one processor, and a keyboard 506. The display 502, housing 504 and keyboard 506 can be, for example, a point-of-sale terminal.

The non-parallax optical auto-focusing system 100 as shown in FIG. 1 includes an image generating assembly 110, a quadrant sensor assembly 120, a first beam splitter 130, a second beam splitter 140, and a lens 150. An actuator 124 operatively coupled to the lens 150 is capable of moving the lens 150 along an optical axis-X as further described below. The lens 150 can be several lenses where one or more of the lenses are moved along the optical axis-X The first and second beam splitters 130, 140 and the lens 150 are positioned along the optical axis-X of the non-parallax optical auto-focusing system 100 as shown in FIG. 1. An image sensor 180 is also positioned along the optical axis-X. The non-parallax optical auto-focusing system 100 further includes a signal processor 164 and a controller 168, which together with the quadrant sensor assembly 120 combine to form a feedback system for controlling the position of the lens 150 along the optical axis-X.

The image generating assembly 110 includes a beam generator 102 for generating an aiming beam 112. Preferably, the beam generator 102 is a laser beam generator that forms a laser beam using a laser source, for example, a gas laser tube or a semi-conductor laser diode. Examples of semi-conductor diodes include edge-emitting injection lasers or vertical-cavity surface-emitting laser diodes (VC-SELs) as disclosed in U.S. Pat. No. 6,024,283 to Campanelli et al., assigned to Symbol Technologies, Inc. Gas filled tubes include tubes filled with xenon or other gases that are commonly used in electronic flash devices for generating a laser output. The beam generator 102 is capable of generating an aiming beam having suitable characteristics for impinging an optical target 113, such as an optical code, and producing a reflected beam 114. The reflected beam 114 includes components representative of the optical target 113.

The beam generator 102 is preferably positioned in a manner such that the generated aiming beam 112 is substantially perpendicular to the optical axis-X of the non-parallax optical auto-focusing system 100. However, other positional configurations for the beam generator 102 are contemplated. For example, the beam generator 102 can be positioned such that the aiming beam 112 is substantially parallel to the optical axis-X. In such a configuration, one or more optical elements are positioned in the path of the aiming beam 112 for redirecting the aiming beam 112 along a path, which is perpendicular to the optical axis-X. The beam generator 102 can also generate a pulsed aiming beam by switching the beam generator 102 on and off at a predetermined rate.

Advantageously, the image generating assembly 110 further includes an optical assembly 108 that is capable of adjusting optical characteristics of the aiming beam 112. In a preferred embodiment, the optical assembly 108 includes an output lens 104 and a disc 105 having an aperture 106. The output lens 104 directs the aiming beam 112 towards the first beam splitter 120. The output lens 104 is made from a suitable optical material, such as glass, plastic, or a combination of these and other materials. The output lens 104 may be coated with an optical coating for reducing or minimizing reflection and/or refraction of the aiming beam 112 as known in the art.

The output lens 104 directs the aiming beam 112 through the aperture 106. The aperture 106 is capable of conditioning the aiming beam 112 to include a predetermined geometrical shape or design (e.g. a cross, an "x", a square, a dot, or other desired shape or design). In a preferred embodiment, the aperture 106 is a diffractive optical element.

The first beam splitter 130 is angularly positioned with respect to the optical axis-X of the non-parallax optical auto-focusing system 100 as shown in FIG. 1. Hence, substantially the entire aiming beam 112 redirects along the optical axis-X as output beam 126. The output beam 126 is substantially orthogonal to the aiming beam 112.

The first beam splitter 130 is made from a suitable optical material such as glass, plastic, or a combination of these and other materials. The first beam splitter 120 may be coated with an optical coating for reducing or minimizing reflection and/or refraction of the aiming beam 112, the output beam 126, and the reflected beam 114.

After the aiming beam 112 is redirected by the first beam splitter 130, it exits the non-parallax optical auto-focusing system 100 and the optical code reader 200 (FIGS. 2 and 3) as the output beam 126. The output beam 126 impinges optical target 113 thereby generating the reflected beam 114. The reflected beam 114 includes components representative of the optical target 113 for decoding data encoded by the optical target 113, if the optical target 113 is an optical code of a particular symbology as known in the art.

As the reflected beam 114 travels along the optical axis-X of the non-parallax optical auto-focusing system 100, a portion of the reflected beam 114, and preferably substantially the entire reflected beam 114, traverses through the first beam splitter 130. If the aiming beam 114 is pulsed at a predetermined rate or frequency, it is preferred that the interval between the aiming beam pulses is such that the reflected beam 114 does not interfere with the aiming beam pulses.

With continued reference to FIG. 1, the reflected beam 114 propagates along the optical axis-X and traverses through the lens 150. The entire reflected beam 114 substantially traverses the lens 150 and propagates towards the second beam splitter 140.

The lens 150 is made from a suitable optical material such as glass, plastic, or a combination of these and other materials. The lens 150 may be coated with an optical coating for reducing or minimizing reflection and/or refraction of the reflected beam 114. As mentioned above, the lens 150 is operatively coupled to the actuator 124 for proximal and distal movement along the optical axis-X.

When the reflected beam 114 reaches the second beam splitter 140, which is also angularly positioned with respect to the optical axis-X, a portion of the reflected beam 114 passes through the second beam splitter 140 as image beam 116. Another portion of the reflected beam 114 is redirected substantially perpendicular to the optical axis-X as redirected reflected beam 115. Preferably, the lens 150 is at a position along the optical axis-X such that the image beam 116 projects an image of the optical target 113 substantially on a planar surface of the image sensor 180 for forming a data signal suitable for decoding by associated decoding circuitry of the optical code reader 200 as known in the art.

The second beam splitter 140 is made from a suitable optical material, such as glass, plastic, or a combination of these and other materials. The second beam splitter 140 may be coated with an optical coating for reducing or minimizing reflection and/or refraction of the reflected beam 114, the redirected reflected beam 115, and the image beam 116.

The image sensor 180 preferably includes a two-dimensional array of cells or photo sensors that correspond to image elements or pixels in a field of view of the optical code reader 200. The image sensor 180 is preferably a charge coupled device (CCD) having associated circuits for producing electronic signals corresponding to a two-dimensional array of pixel information of a field of view of the optical code reader 200. The image sensor 180 processes the information included in the image beam 116 and communicates the processed data to a host processor or other processor including signal processor 164.

The portion of the reflected beam 114, which is directed perpendicular to the optical axis-X, i.e., the redirected reflected beam 115, is received by the quadrant sensor assembly 120. The quadrant sensor assembly 120 includes the following components in the order that the assembly 120 receives the redirected reflected beam 115: a receiving lens 138, an optical filter 142, an optical mask 148, and a quadrant sensor or photodetector 160.

The receiving lens 138 is made from a suitable optical material, such as glass, plastic, or a combination of these and other materials. The receiving lens 138 may be coated with an optical coating for reducing or minimizing reflection and/or refraction of the redirected reflected beam 115. Preferably, the receiving lens 138 focuses the redirected reflected beam 115 such that substantially the entire redirected reflected beam 115 is directed towards the optical filter 142.

After the redirected reflected beam 115 exits the receiving lens 138, it passes through the optical filter 142. It is preferred that the optical filter 142 is made from a suitable optical material, such as glass, plastic, or a combination of these and other materials. The filter 142 may be coated with an optical coating for reducing or minimizing reflection and/or refraction of the redirected reflected beam 115.

Preferably, the optical filter 142 and the receiving lens 138 optically cooperate with each other to reduce or minimize reflection and/or refraction of the redirected reflected beam 115. After the redirected reflected beam 115 passes through the receiving lens 138 and the optical filter 142, it has substantially identical characteristics of the aiming beam 112, such as the predetermined geometric shape or design (e.g., a cross, an "x", a square, a dot, or other desired shape or design), therefore being suitable for reception by the optical mask 148.

The receiving lens 138 and the optical filter 142 focus the redirected reflected beam 115 such that substantially the entire redirected reflected beam 115 transmits through the optical mask 148. It is preferred that the optical mask 148 is optimized for maximum transmission of the geometric shape or design corresponding to the shape or design projected by the aiming beam 112, the reflected beam 114, and the redirected reflected beam 115.

The optical mask 148 has a mask corresponding to the shape or design of the aperture 106 for providing optimal transmission of the desired characteristics of the redirected reflected beam 115, such as the predetermined geometric shape or design (e.g., a cross, an "x", a square, a dot, or other desired shape or design). The mask inhibits transmission of unwanted characteristics of the redirected reflected beam 115, such as components representative of the optical target 113.

The receiving lens 138, the optical filter 142, and the optical mask 148 optically cooperate with each other to direct the image corresponding to the predetermined geometric shape or design to the center of the quadrant sensor 160 as shown in FIG. 1. The quadrant sensor or photodetector 160 determines optical qualities of the redirected reflected beam 115, while the image beam 116 is impinging upon the image sensor 180.

In a preferred embodiment, the quadrant sensor 160 determines or measures the power level or light intensity of the redirected reflected beam 115 impinging in its center using a processor, associated software and/or circuitry, such as a set of programmable instructions capable of being executed by the processor, comparators, dividers, etc., as known in the art. If the measured power level or light intensity is outside a predetermined power range, or the difference between the measured power level or light intensity of the reflected beam 114 and an optimum, or desired power level or light intensity is greater than a predetermined threshold, the quadrant sensor 160 generates an output signal 162.

The predetermined power range, optimum and/or desired power levels or light intensities are programmed within the processor of the quadrant sensor 160 and/or the signal processor 164 using conventional programming techniques. If these parameters are programmed within the signal processor 164, the quadrant sensor 160 is designed to retrieve these values for performing the above-mentioned system calculations.

One may design the system 100 of the present invention, such that the quadrant sensor 160 transmits the measured power level or light intensity of the redirected reflected beam 115 to the signal processor 164. The signal processor 164 then performs the system calculations.

The output signal 162 generated by the quadrant sensor 160 is indicative of the difference between the measured power level or light intensity of the redirected reflected beam 115 and either the minimum or maximum value of the predetermined power range. The output signal 162 can also be indicative of the difference between the measured power level or light intensity of the redirected reflected beam 115 and the optimum, or desired power level or light intensity. The output signal 162 is received by the signal processor 164 for determining whether to actuate the actuator 124. It is contemplated that the quadrant sensor 160 determines whether the actuator 124 needs to be actuated, and generates the output signal 162 only if the actuator 124 needs to be actuated.

The signal processor 164 receives the output signal 162 from the quadrant sensor 160. Using the information relayed by the output signal 162, the signal processor 164 generates a corresponding control signal 166. The control signal 166 preferably indicates the actuation time for the actuator 124, in order to move the lens 150 to a specific position for decreasing the difference determined by the quadrant sensor 160.

The signal processor 164 determines the amount of time the actuator 124 needs to be actuated by accessing one or more look-up tables or other data structures. One look-up table correlates the measured light intensity or other measured parameter with a "true" position, i.e., a position the lens 150 should be located at along the optical axis-X with respect to a reference position for optimum focusing of the image on the image sensor 180. If the measured parameter correlates to a position within a predetermined margin of error with respect to the true position, the signal processor 164 does not output the control signal 166.

If the measured parameter does not correlate to a position within a predetermined margin of error with respect to the true position, the signal processor 164 determines a distance the lens 150 needs to be moved to be at a position within a predetermined margin of error with respect to the true position. Another look-up table or other data structure is accessed which correlates the distance the lens 150 needs to be moved to the amount of time the actuator 124 needs to be actuated to move the lens 150 to the determined position.

The amount of time that the actuator 124 is to be actuated is transmitted to the controller 168 via the control signal 166. The various look-up tables and other data structures are preferably stored within the signal processor 164 and/or a host processor (not shown). It is contemplated that the signal processor 164 and the controller 168 are located within a host optical code reading terminal capable of controlling, via a hard-wired or wireless connection, the actuator 124 for each of a plurality of optical code readers, such as optical code reader 200.

A look-up table can be used to also correlate the measured power level or light intensity to the distance between the lens 150 and the optical target 113. The determined distance can then be used to determine the distance the lens 150 needs to be moved, if any, for focusing the optical target 113 onto the image sensor 180 using a look-up table or other data structure. A display or LED panel may display the determined distance for informing the user of the approximate distance between the lens 150 and the optical target 113. Accordingly, the optical code reader 200 can determine the distance between the lens 150 and the optical target 113 without being prone to errors due to parallax.

As it is evident from the previous description, it is necessary for the system 100 of the present invention to know the current position of the lens 150, in order to determine the distance the lens 150 needs to be moved to be within the predetermined margin of error with respect to the true position. As such, the signal processor 164 executes a set of programmable instructions for continuously determining or updating the position of the lens 150 with respect to the reference position. The signal processor 164 continuously adds and subtracts the distance amount the lens 150 is to be moved and hence, updates the position of the lens 150, even before the lens 150 is physically moved.

When the optical code reader 200 is turned off, the position of the lens 150 defaults to a zero or to the reference position and the lens 150 is moved to this position by the actuator 124. The zero position may be the central position between the two beam splitters 130, 140 as shown in FIG. 1. When the optical code reader 200 is turned on, the signal processor 164 is programmed to know that the lens 150 is at the zero position. The signal processor 164 then keeps a running calculation on the position of the lens 150 by adding or subtracting the amount of movement with respect to the reference or zero position. Alternatively, when the optical code reader 200 is turned off, the position of the lens 150 is recorded and stored by the non-parallax auto-focusing system 100 in the signal processor 164 as a shutdown position. When the optical code reader 200 is turned on, the signal processor 164 is programmed to know that the lens 150 is at the shutdown position and calculates the difference between the shutdown position and the zero position. The signal processor 164 then keeps a running calculation of the position of the lens 150 as discussed hereinabove.

As described above, the control signal 166 relays the amount of time the actuator 124 needs to be actuated. Alternatively, the control signal 166 may relay the distance the lens 150 needs to be moved. If the latter, the controller 168 determines using a look-up table or other data structure as described above with reference to the signal processor 164, the amount of time the actuator 124 needs to be actuated for moving the lens 150 to a position which is within the predetermined margin of error with respect to the true position.

By determining, either by the signal processor 164 or the controller 168, the amount of time the actuator 124 needs to be actuated, the controller 168 generates and transmits an actuation signal 170 for a time equal to the determined amount of time. The controller 168 may use a timer for timing the determined amount of time.

Upon receiving the actuation signal 170, the actuator 124 is actuated for a time equal to the amount of time determined that the actuator 124 needs to be actuated for moving the lens 150 to the position which is within the predetermined margin of error with respect to the true position. It is contemplated that the signal processor 164 can be integrated with the controller 168, such that the output signal 162 from the quadrant sensor 160 results in the generation of the actuation signal 170 by the integrated signal processor/controller.

Each of the signals generated by the system 100 and described herein may be analog or digital waveforms. One or more digital-to-analog, or analog-to-digital, converters can be provided to the non-parallax optical auto-focusing system 100 to convert waveforms from digital to analog, and vice versa, as necessary.

The actuator 124 is actuated and moves the lens 150 upon receiving the actuation signal 170. The actuator 124 remains actuated, until the controller 168 stops transmitting the actuation signal 170. The actuation signal 170 is preferably a voltage or current signal for actuating the actuator 124. The actuated actuator 124 moves the lens 150 along the optical axis-X by a distance as determined by the system 100, such that the lens 150 is moved to a position within the predetermined margin of error with respect to the true position.

The movement of the lens 150 along the optical axis-X changes the focus quality of the reflected beam 114 resulting in changing the focus quality of the image projected by the image beam 116 onto the image sensor 180. The movement of the lens 150 further changes the measured power level or light intensity of the redirected reflected beam 115 as determined by the quadrant sensor assembly 120.

Since the measured power level or light intensity of the redirected reflected beam 115 changes, i.e., increases, as determined by the quadrant sensor assembly 120, the differences described above and determined by the quadrant sensor 160 also change. This indicates that the focusing of the image projected by the image beam 116 upon the image sensor 180 improves as the lens 150 moves along the optical axis-X.

As the value of the measured power level or light intensity increases, the information conveyed by the output signal 162 changes accordingly. Eventually, it may be determined by the quadrant sensor assembly 120, that the lens 150 does not need to be moved. If this is the case, the output signal 162 does not need to be generated by the quadrant sensor assembly 120 and the feedback system is, in effect, idled, until it is determined once again by the system 100 that the lens 150 needs to be moved.

By continually monitoring, measuring and comparing the light intensity of the redirected reflected beam 115 with the desired power level (or minimum/maximum values of the predetermined power range), the quadrant sensor assembly 120 is able to determine the difference between these values in real-time. The signals of the system 100 are generated in real-time for actuating the actuator 124 and moving lens 122 for adjusting the focus of the reflected beam 114. By adjusting the focus of the reflected beam 114, the focus of the redirected reflected beam 114 and the image beam 116 are also adjusted.

The actuator 124 is responsive to an input that includes either a digital or an analog waveform. In one configuration, the actuator 124 includes an electric motor and associated circuitry. The actuation signal 170 is communicated to the associated circuitry for operating the motor. The duration of the motor's operation corresponds to duration of the actuation signal 170 as described above. The motor is mechanically coupled to the lens 150 by connecting arms, linkages, gears, or other structures known in the art.

Another actuator 160 suitable for use by the system 100 includes a voice coil assembly having a voice coil, a yoke, a magnet, and associated circuitry. An example of such an actuator is described in U.S. patent application Ser. No. 10/425,344 filed on Apr. 29, 2003, the contents of which are hereby incorporated by reference in their entirety. The actuation signal 170 is communicated to the associated circuitry of the actuator 124 where the associated circuitry generates a coil control signal. The coil control signal is communicated to a voice coil in the voice coil assembly for varying the flow of current through the coil. A variation in the current through the voice coil will cause a change in the flux created by the voice coil and the resulting electromagnetic force between the voice coil and the yoke. Since the yoke is being held stationary by the magnet, the voice coil will move with respect to the yoke. The voice coil may be attached to the lens 150 or positioned adjacent thereto such that movement of the coil will cause movement of the lens 150. When the voice coil is not attached to the lens, it may be mechanically coupled to the lens 150 by connecting arms, linkages, gears, or other structures known in the art.

In a preferred embodiment, the actuator 124 only initiates movement of the lens 150 when the actuation signal 170 is at or above a preselected value, where the preselected value is greater than the minimum differential value (i.e. the difference between the measured light intensity of the redirected reflected beam 115 and the desired power level is minimal). By providing a minimum threshold value for the actuation signal 170 to actuate the actuator 124 for moving the lens 150 (i.e. a dead-band), the non-parallax optical auto-focusing system 100 will not "hunt" when the desired focus of the redirected reflected beam 115 is achieved.

As defined herein, "hunting" refers to the state where the non-parallax optical auto-focusing system 100 will initiate movement of the lens 150 in response to small, and less desirable, fluctuations in the difference between the measured light intensity of the redirected reflected beam 115 and the desired power level (or minimum/maximum values of the predetermined power range). These differences in values may result from variations of the voltages or currents present within the non-parallax optical auto-focusing system 100 and are not necessarily indicative of the desired focus of the redirected reflected beam 115.

Alternatively, the non-parallax optical auto-focusing system 100 may minimize "hunting" by generating the output signal 162, and therefore the actuation signal 170, only when the difference between the measured light intensity of the redirected reflected beam 115 and the desired power level (or minimum/maximum values of the predetermined power range) is at or above a predetermined value, or threshold. This design provides a dead-band to inhibit "hunting." Preferably, the non-parallax optical auto-focusing system 100 can also be designed to advantageously combine a first dead-band in the measuring structure (i.e., the quadrant sensor 160 and the signal processor 164, or the quadrant sensor 160 and the controller 168) and a second dead-band in the actuating structure (i.e., the actuator 124 and the lens 150). This design also inhibits "hunting" of the non-parallax optical auto-focusing system 100 as it adjusts the focus of the redirected reflected beam 115.

Figure 3:
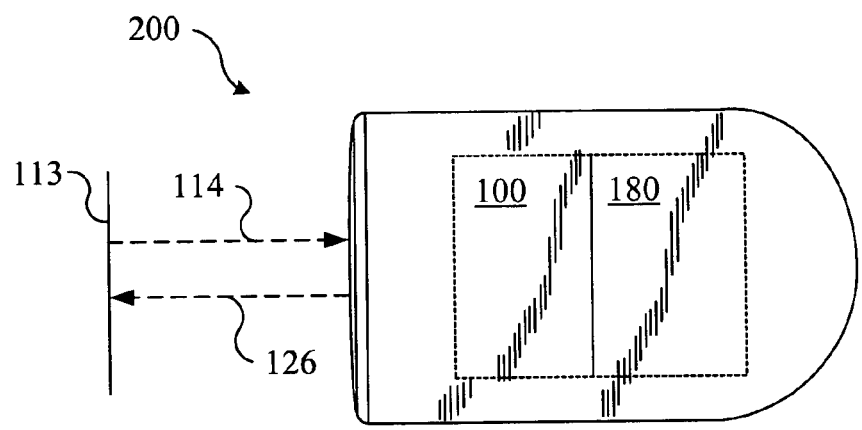
FIG. 3 is a top plan view of the optical code reading system shown in FIG. 2.
Figure 2:
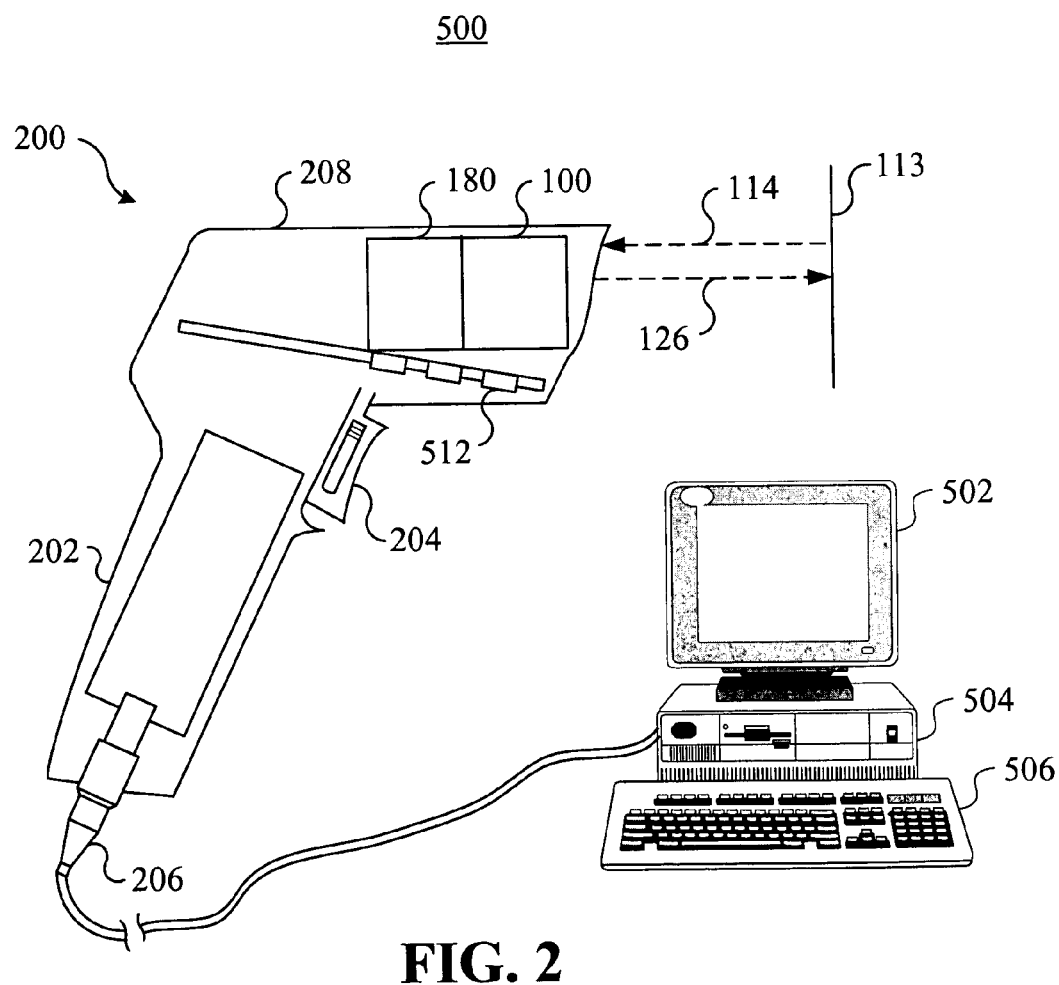
FIG. 2 is a side view of an optical code reading system according to an embodiment of the present invention.

FIGS. 2 and 3 show the invention within an optical code reader 200. The non-parallax optical auto-focusing system 100 and the image sensor 180 are disposed within a head section 210 of the optical code reader 200. The optical code reader 200 further includes a handle portion 202 having an actuation mechanism 204, a connector 206, and associated circuitry 208 for operating the optical code reader 100.

The actuation mechanism 204 is illustrated as a trigger assembly, but other suitable actuation mechanisms, such as push buttons or switches, may be substituted for the trigger assembly without departing from the scope of the present invention. The actuation mechanism 204 is preferably wired for actuating a read/decode operation of the optical code reader 200, as well as simultaneously operating the system 100 of the present invention.

The connector 206 couples the optical code reader 200 with other components (not shown) in the optical code reading system 500. Although the connector 206 is shown as a cable in FIG. 2, it is contemplated that other structures, including wireless configurations (e.g. radio frequency or infrared), may be employed for connecting the optical code reader 200 with the remaining components (not shown) of the optical code reading system 500.

The flow chart shown in FIG. 4 illustrates an exemplary method according to the present invention with respect to the optical code reading system 500. At step 300, an operator aims the optical code reader 200 of the optical code reading system 500 at the optical target 113. The optical code reader 200 is actuated at step 310 via the actuation mechanism 204. Upon activation of the optical code reader 200, the image generating assembly 110 generates the output beam 126 that includes the preselected geometric shape or design as discussed in detail hereinabove.

At step 320, the output beam 126 impinges upon the optical target 113 and reflects back towards the optical code reader 200 as the reflected beam 114. The optical code reader 200 receives the reflected beam 114. At step 330, the reflected beam 114 is split by the second beam splitter 140 to form the redirected reflected beam 115. At step 340, the quadrant sensor assembly 120 processes the redirected reflected beam 115. Based on the processing of the redirected reflected beam 115, the method, at step 350, determines whether the lens 150 needs to be moved to focus the image of the optical target 113 impinged onto the image sensor 180.

If the method determines that the lens 150 is appropriately positioned for imaging and decoding the optical target 113, the process ends. On the other hand, if the method determines that the lens 150 is not appropriately positioned between the two beam splitters 130, 140, the process enters a feedback mode and continues with step 360.

At step 360, the controller 168 generates the actuation signal 170 and the actuator 124 is actuated for an amount of time equal to the predetermined amount of time. Hence, at step 370, the lens 150 is moved for adjusting the focus of the image beam 116 onto the image sensor 180. By adjusting the focus of the image beam 116, the focus quality of the image impinged onto the image sensor 180 and the focus of the redirected reflected beam 115 onto the quadrant sensor 160 also adjust or change.

Accordingly, when the process reprocesses the redirected reflected beam 115 at step 340 and a determination is made at step 350, it may be determined that the lens 150 does not need to be moved. The process will then end, unless it is determined that the lens 150 is still not appropriately positioned.

If the process ends, the system 100 has obtained a desired focus of the optical target 113, and the optical code reader 200 can then accurately read and decode the optical target 113, as known in the art, using a decoder 512, without getting a misread or error. The decoder 512 includes decoding algorithms for decoding images representative of a plurality of symbologies as known in the art.

By directing the aiming beam and focusing the reflected beam 114 along the optical axis-X of the non-parallax optical auto-focusing system 100 and by not using triangulation, the present invention optimally focuses the optical target 113 and determines distance to the optical target 113 without introducing errors due to parallax.

The system 100 described herein is a "smart" system. It is able to determine values and correlate these values with values stored within look-up tables or other data structures for determining the amount of actuation time for the actuator 124. Further, it is able to actuate the actuator 124 according to the determined amount of time for moving the lens 150 along the optical axis-X with respect to the reference position for instantaneously or in real-time focusing the image impinged upon the image sensor 180. The system 100 can alternatively be configured to simply actuate the actuator 124 until the measured parameter, i.e., measured light intensity of the redirected reflected beam 115, is within the predetermined range.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A non-parallax optical auto-focusing system comprising:
   a moveable lens;
   an actuator coupled to the lens for moving the moveable lens along an optical axis;
   a first beam splitter positioned in the optical axis on a first side of the moveable lens for directing at least a portion of an aiming beam along the optical axis and toward an externally located optical target for generating a reflected aiming beam;
a second beam splitter positioned in the optical axis on a second side of the moveable lens for redirecting at least a portion of the reflected aiming beam at an angle perpendicular to the optical axis, wherein the first and second sides in the optical axis are substantially opposite with respect to each other;
a sensor assembly having a photodetector adapted to receive the redirected reflected aiming beam, and determine a parameter of the redirected reflected aiming beam, and having means for generating an output signal based on the determined parameter; and
an image sensor wherein said output signal is used for focusing an image of the optical target onto the image sensor.

2. The non-parallax optical auto-focusing system of claim 1, further comprising an optical code reader having a form factor and associated circuitry for decoding the optical target imaged on the image sensor, said optical code reader configured and adapted to receive the non-parallax optical auto-focusing system within said form factor.

3. The non-parallax optical auto-focusing system of claim 1, further comprising an aiming beam assembly for generating the aiming beam, said aiming beam assembly having means for directing the aiming beam towards the first beam splitter and perpendicular to the optical axis.

4. The non-parallax optical auto-focusing system of claim 3, wherein said means for directing includes a disk having an aperture for transmitting the aiming beam therethrough and towards the first beam splitter.

5. The non-parallax optical auto-focusing system of claim 1, further comprising a signal processor adapted to receive the output signal and capable of generating a control signal based on information relayed by the output signal, said signal processor further adapted to execute a set of programmable instructions for updating the position of the moveable lens between the first and second beam splitters with respect to a reference position.

6. The non-parallax optical auto-focusing system of claim 5, further comprising a controller adapted to receive the control signal and generate an actuation signal for actuating an actuator operatively coupled to the lens for moving the moveable lens along the optical axis, wherein movement of the moveable lens along the optical axis adjusts the focus of the image of the optical target onto the image sensor.

7. The non-parallax optical auto-focusing system of claim 6, wherein the control signal relays to the controller one of an amount of time the actuator is to be actuated and an amount the lens is to be moved along the optical axis.

8. The non-parallax optical auto-focusing system of claim 6, wherein said signal processor and said controller are located within a host optical code reading terminal in operative communication with said actuator.

9. The non-parallax optical auto-focusing system of claim 5, further comprising at least one look-up table accessible by the signal processor for correlating the parameter with a distance to the optical target for determining a distance to the optical target.

10. The non-parallax optical auto-focusing system of claim 1, further comprising means for determining whether to generate the output signal based on a value of the determined parameter.

11. An optical code reading system comprising:
an optical code reader having an image sensor and associated circuitry; and
a non-parallax optical auto-focusing system comprising:
a lens operatively coupled to an actuator and capable of being moved by said actuator along an optical axis of the optical code reader;
an aiming beam assembly capable of producing an aiming beam;
a first beam splitter positioned in the optical axis of said optical code reader on a first side of the lens for directing at least a portion of said aiming beam along the optical axis and toward an externally located optical target for generating a reflected aiming beam;
a second beam splitter positioned in the optical axis of said optical code reader on a second side of the lens for redirecting at least a portion of the reflected aiming beam at an angle perpendicular to the optical axis wherein the first and second sides of the lens are substantially opposite with respect to each other; and
a feedback system adapted to receive the redirected reflected aiming beam, determine a parameter thereof, and generate at least one signal for repositioning the lens according to the determined parameter of the redirected reflected aiming beam.

12. The optical code reading system of claim 11, wherein the feedback system comprises:
a sensor assembly adapted to receive the redirected reflected aiming beam and generate an output signal indicative of a value determined using the determined parameter of the redirected reflected aiming beam;
a signal processor adapted to receive the output signal and capable of generating a control signal based on information relayed by the output signal; and
a controller adapted to receive the control signal, and generate an actuation signal for actuating the actuator operatively coupled to the lens for moving the lens along the optical axis of the optical code reader.

13. The optical code reading system of claim 12, wherein the sensor assembly includes an optical assembly having at least one mask for inhibiting transmission of at least a portion of the redirected reflected aiming beam.

14. The optical code reading system of claim 11, wherein the aiming beam assembly includes means for directing the aiming beam towards the second beam splitter and perpendicular to the optical axis.

15. The optical code reading system of claim 14, wherein said means for directing includes at least one diffractive optical element.

16. The optical code reading system of claim 15, wherein the at least one diffractive optical element conditions the aiming beam to project a particular geometrical shape or design.

17. The optical code reading system of claim 11, further comprising means for determining whether to generate the at least one signal based on a value of the determined parameter.

18. A signal generated by a non-parallax optical auto-focusing system, said signal relaying information based on at least one parameter of a redirected reflected aiming beam generated by said non-parallax optical auto-focusing system, wherein said information is used for repositioning a lens of said system to adjust a focus of an image of an externally located optical target onto an image sensor, said system comprising:
a first beam splitter positioned in an optical axis on a first side of said lens for directing at least a portion of an aiming beam along the optical axis and toward the externally located optical target for generating a reflected aiming beam;

a second beam splitter positioned in the optical axis on a second side of said lens for redirecting at least a portion of the reflected aiming beam at an angle perpendicular to the optical axis to form said redirected reflected aiming beam, wherein the first and second sides of said lens are substantially opposite with respect to each other; and an actuator for repositioning the lens according to the information relayed by said signal.

19. The signal of claim 18, wherein said at least one parameter is a light intensity of the redirected reflected aiming beam and said information includes an amount of time the actuator is to be actuated for repositioning the lens.

20. A method for focusing an image onto an image sensor positioned along an optical axis of an optical code reading system, said method comprising the steps of:

producing an aiming beam;

directing at least a portion of said aiming beam substantially along the optical axis of the optical code reading system and toward an optical target using a first beam splitter;

processing at least a portion of a beam reflected by said optical target and redirected away from said optical axis by a second beam splitter to determine at least one parameter of said redirected reflected beam;

generating at least one signal based on a value of the at least one parameter; and actuating an actuator using a signal of said at least one signal for moving a lens operatively coupled to the actuator and positioned between the first and second beam splitters along the optical axis, wherein the movement of said lens adjusts a focus of the image of the optical target onto the image sensor.

21. The method of claim 20, further comprising the step of determining a distance to the optical target by accessing a look-up table correlating the at least one parameter with a distance to the optical target.

22. A method for determining a distance to an optical target using an optical code reading system having an image sensor positioned along an optical axis of the system, said method comprising the steps of:

producing an aiming beam;

directing at least a portion of said aiming beam substantially along the optical axis of the optical code reading system and toward an optical target using a first beam splitter;

processing at least a portion of a beam reflected by said optical target and redirected away from said optical axis by a second beam splitter to determine at least one parameter of said redirected reflected beam; and accessing a look-up table correlating the at least one parameter with the distance to the optical target;

generating at least one signal based on a value of the at least one parameter; and actuating an actuator using a signal of said at least one signal for moving a lens operatively coupled to the actuator and positioned between the first and second beam splitters along the optical axis, wherein the movement of said lens adjusts a focus of an image of the optical target onto the image sensor.

* * * * *